United States Patent [19]
Scholdstrom

[11] 3,748,026
[45] July 24, 1973

[54] REFLECTOR FOR DISTANCE MEASUREMENT

[75] Inventor: Ragnar Scholdstrom, Lidingo, Sweden

[73] Assignee: AGA Aktiebolag, Lidingo, Sweden

[22] Filed: Aug. 23, 1971

[21] Appl. No.: 174,082

[30] Foreign Application Priority Data
Aug. 31, 1970 Sweden .............................. 11814/70

[52] U.S. Cl. .................. 350/287, 350/288, 350/299
[51] Int. Cl. ............................................. G02b 7/18
[58] Field of Search ............. 350/286, 287, 97–103, 350/301, 288, 299; 356/74

[56] References Cited
UNITED STATES PATENTS

| | | | |
|---|---|---|---|
| 3,622,232 | 11/1971 | Munnerlyn .......................... | 350/301 |
| 3,333,502 | 8/1967 | Flanagan ............................ | 350/286 |
| 3,420,138 | 1/1969 | Hansen ............................... | 356/74 |
| 3,170,982 | 2/1965 | Hemstreet et al. ................. | 350/102 |

Primary Examiner—Ronald L. Wibert
Assistant Examiner—Michael J. Tokay
Attorney—Larson, Taylor & Hinds

[57] ABSTRACT

A light reflector having a corner prism mounted for pivotal movement about at least one axis intersecting the optical axis of the prism between the vertex and the base surface. The distance between the pivotal axis and the base surface is chosen in accordance with a special relationship for minimizing measurement errors due to misalignment of the prism with respect to incident light beams.

1 Claim, 3 Drawing Figures

REFLECTOR FOR DISTANCE MEASUREMENT

This invention relates to a reflector for use in connection with distance measurement by means of electromagnetic waves.

Distance measurement by means of a modulated light beam often includes the use of reflectors having so-called corner prism as reflecting member. A corner prism has three mutually perpendicular reflecting surfaces and a base surface through which the light beam enters the prism and can be made by cutting a corner from a solid glass cube. It has the property of reflecting the light beam parallel to the direction of incidence so that the incident and emerging beams are parallel. Thanks to this property, the optical axis of the prism need not be accurately aligned with the incident light beam but may form a substantial angle with the incident light beam.

If the prism is misaligned, that is if the incident light beam is not normal to the base surface, the optical length (the geometrical distance multiplied by the refractive index) traversed by the light will differ slightly from the optical length traversed by the light when the prism is accurately aligned. Hence, the time required for the light to travel from a distance meter to the reflector and back to the distance meter is dependent on the adjustment of the prism to some extent. Normally the difference is very small and of no practical importance, and besides it has hitherto been practically impossible to measure distances electrooptically with such a high accuracy that the difference affects the measuring result.

With the ever increasing accuracy of electro-optical distance meters, however, the measuring error due to misalignment of the prism may become important, and a general object of the invention is to render that measuring error neglectable even for very accurate measurements without the prism having to be accurately aligned with respect to the incident light beam.

Basically, the invention consists in providing at least one pivot axis for the prism which intersects the optical axis of the prism intermediate the vertex and the base surface at a given distance from the latter. In use of the reflector, the point of intersection constitutes one end of the distance to be measured.

The full nature of the invention will be understood from the description which follows and the accompanying diagrammatic drawing.

Figure 1:
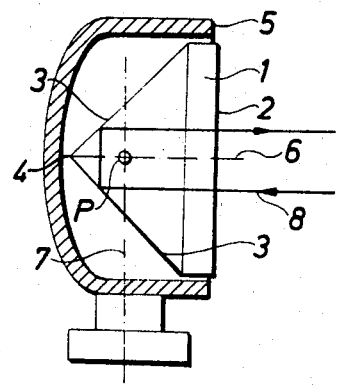
FIG. 1 is a view in perspective of a corner prism.
Figure 2:
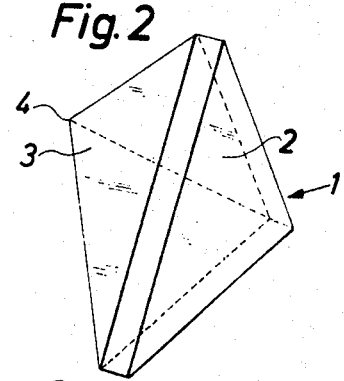
FIG. 2 is a diagrammatic view in vertical section of a reflector embodying the principles of the invention.

The corner prism 1 shown in FIG. 1 generally has the shape of a regular pyramid having a base surface 2 adapted to admit light into the prism and three mutually perpendicular reflecting lateral faces 3 intersecting each other in the vertex 4. As shown in FIG. 2, the prism 2 is mounted in an open-sided housing 5 for pivotal movement about a horizontal axis which intersects the optical axis 6 of the prism, that is, the axis of symmetry of the pyramid, in a point P, hereinafter termed the reference point. The prism 1 and the housing 5 are rotatable as a unit about a vertical axis 7 passing through the reference point P.

In use, the housing 5 is secured to a suitable support, such as a tripod, with the reference point P disposed at one end of the distance to be measured. As will appear from the following calculations, the reference point P should be situated at a distance from the base surface 2 that is related to the height of the prism pyramid and the refractive index of the material of the prism.

The calculations are based on the fact that the optical length traversed within the prism 1 is the same for all rays of a bundle of parallel rays striking the base surface 3 and, thus, equal to the optical length traversed by a light ray of the bundle which falls on the vertex of the prism pyramid and which accordingly is reflected along the incident path. The designations of FIG. 3 are used.

Figure 3:
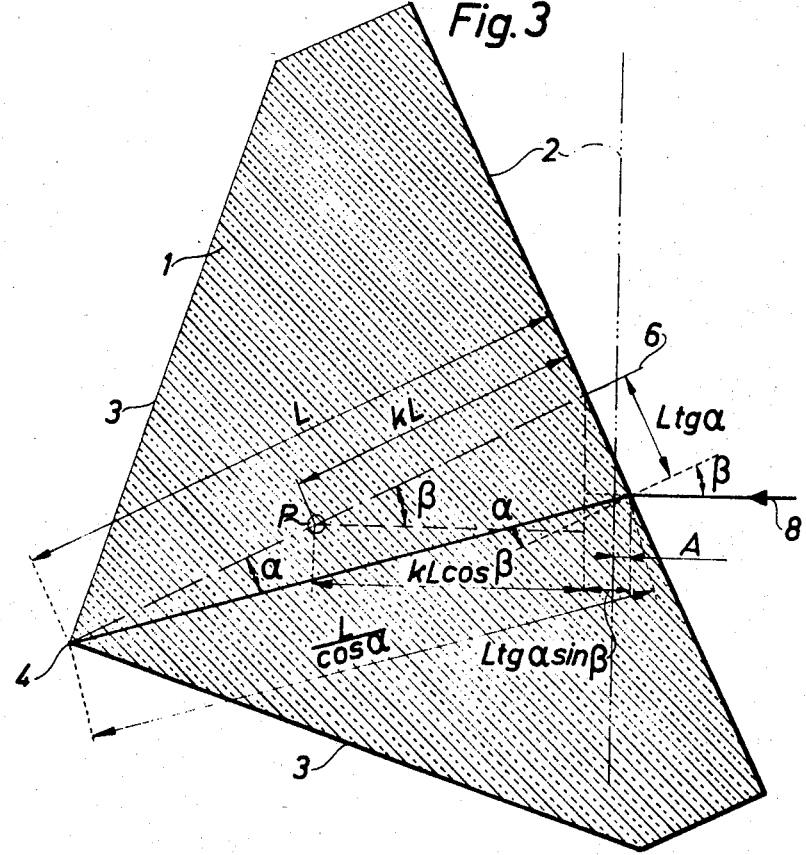
FIG. 3 is a diagrammatic view in vertical section of the prism of the reflector shown in FIG. 2 and serves to illustrate the advantage accruing from the invention.

If the light ray 8 strikes the base surface 2 when that surface is normal to the direction of incidence, as indicated by a vertical dash-dot line in FIG. 3, the optical length $s$ traversed within the prism 1 by the ray is equal to nL, where $n$ is the refractive index of the material of the prism and L is the height of the prism pyramid. If the prism is pivoted an angle $\beta$ about the reference point P — which is situated a distance kL from the base surface 2 — to the position shown in full lines in FIG. 3, the optical length traversed within the prism by the light ray 8, which then has an angle of incidence equal to $\beta$ and an angle of refraction equal to $\alpha$, is equal to $$nL/\cos\alpha$$

However, in comparison with the first case where the light ray strikes the base surface 2 normally, the optical length traversed in the air is reduced an amount which is designated A in FIG. 3 and which can be determined from the relationship $A = kL\cos\beta + Ltg\alpha\sin\beta - kL$. If the resulting optical length is designated $s'$, then $$s' = (nL/\cos\alpha) - Ltg\alpha\sin\beta + kL(1-\cos\beta)$$

The following known relationship may be applied:
$\sin\beta = \beta - (\beta^3/6_2)$
$\cos\beta = 1 - (\beta^2/2)$
$\sin\beta = n \cdot \sin\alpha$
$\cos\alpha = \sqrt{1 - \sin^2\alpha}$ Using these relationship and neglecting terms containing powers of $\beta$ higher than $\beta^3$, the above expression of $s'$ can be written as $$s' = L[n - (\beta^2/2n) = k(\beta^2/2)]$$

Now, if k is chosen such that $k = 1/n$, then $s' = nL = s$. With k so chosen, and with the approximation made, misalignments below 20° have no practical influence at all. If it is desirable to be able to neglect still greater misalignments, it is advantageous to chose the value of k a few percent lower than that corresponding to the relationship $k = (1/n)$. For the common heights L of the prism, the error in the optical length can be kept below 0.1 mm for misalignments below 40°. Preferably, the value of k is chosen so close to the value corresponding to the relationship $k = 1/n$ as to render the error in the optical length due to misalignment of the prism smaller than a value equal to the linear resolving power of the distance meter for misalignments below a predetermined maximum value.

What is claimed is:

1. A reflector for use in distance measurements by means of electromagnetic waves, comprising a corner prism having a base surface and mutually perpendicular reflecting surfaces intersecting each other in a vertex and making equal angles with the base surface, and means for providing rotation of said corner prism about at least one axis intersecting the axis of symmetry of the prism at a point intermediate the base surface and the vertex, the distance between the point and the base surface being approximately equal to $L/n$, where $L$ is the distance, as measured along the axis of symmetry, between the vertex and the base surface, and $n$ is the refractive index of the material of the prism.

* * * * *